J. TRÄGÅRDH.
FILING DEVICE FOR LOOSE LEAVES OR SIMILAR BODIES.
APPLICATION FILED APR. 24, 1913.

1,091,986.

Patented Mar. 31, 1914.

2 SHEETS—SHEET 1.

Witnesses
E. J. Sheeley
N. C. Healy

Inventor
J. Trägårdh
by James Sheeley & Co.

J. TRÄGÅRDH.
FILING DEVICE FOR LOOSE LEAVES OR SIMILAR BODIES.
APPLICATION FILED APR. 24, 1913.
1,091,986.
Patented Mar. 31, 1914.
2 SHEETS—SHEET 2.
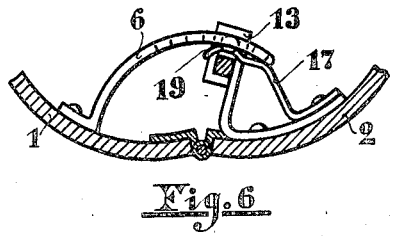
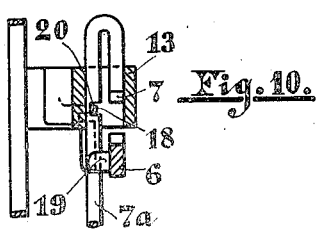
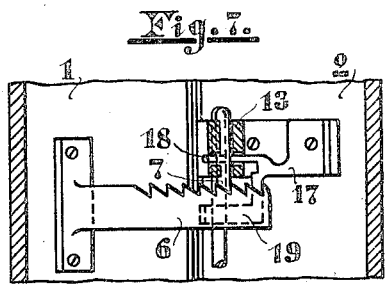
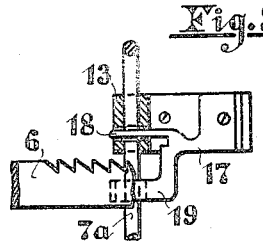
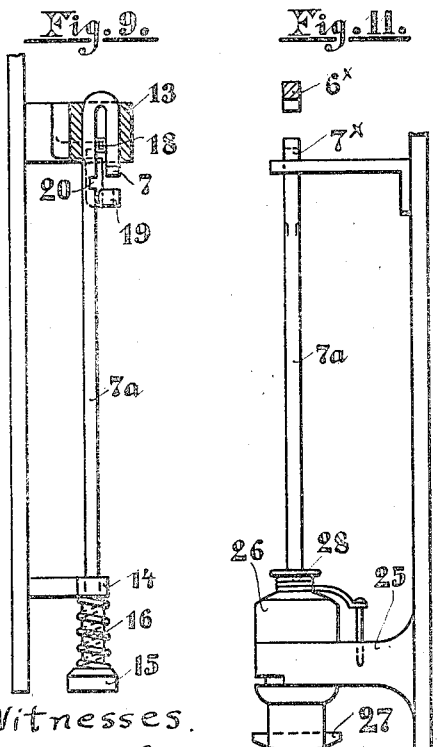
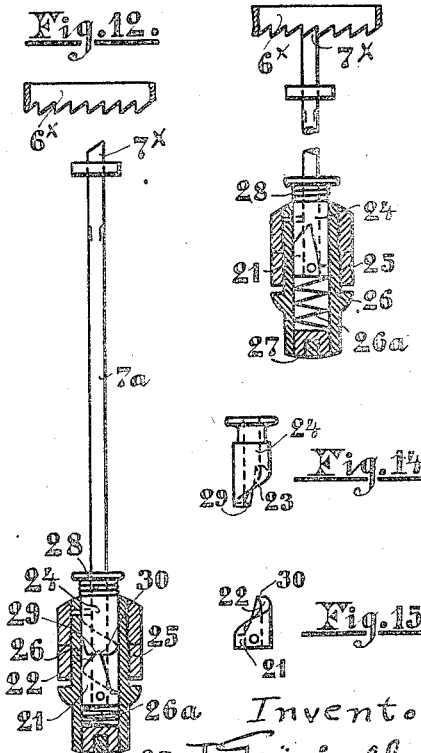
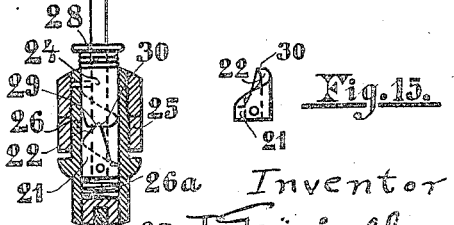

UNITED STATES PATENT OFFICE.

JOHN TRÄGÅRDH, OF GOTTENBORG, SWEDEN.

FILING DEVICE FOR LOOSE LEAVES OR SIMILAR BODIES.

1,091,986.      Specification of Letters Patent.      Patented Mar. 31, 1914.

Application filed April 24, 1913. Serial No. 763,311.

*To all whom it may concern:*

Be it known that I, JOHN TRÄGÅRDH, citizen of Sweden, residing at Gottenborg, in the Province of Gottenborg and Bohus and Kingdom of Sweden, have invented new and useful Improvements in and Relating to Filing Devices for Loose Leaves or Similar Bodies, of which the following is a specification.

This invention relates to filing devices for loose leaves or similar bodies and has for its object to provide a filing ledger adapted to accommodate different numbers of leaves or the like in such a way that the leaves always are retained in a perfect state even when the book is opened out and without influence by the larger or smaller number of leaves in the binder.

A further object of this invention is to provide a lockable attachment of the leaves so as to prevent an unallowable removal of the leaves off the binder.

Figure 1:
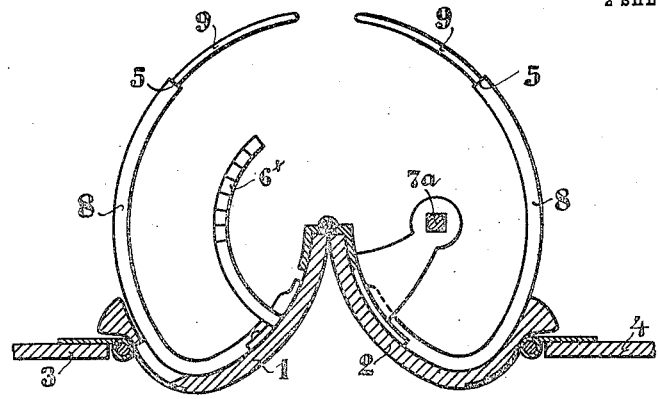
Figure 2:
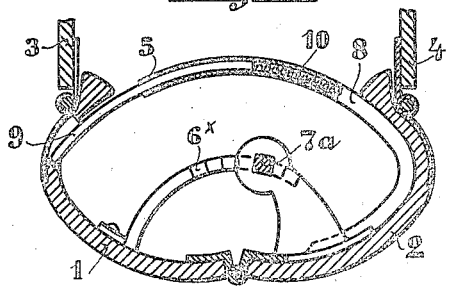
Figure 5:
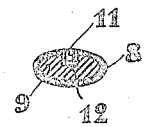
Figure 3:
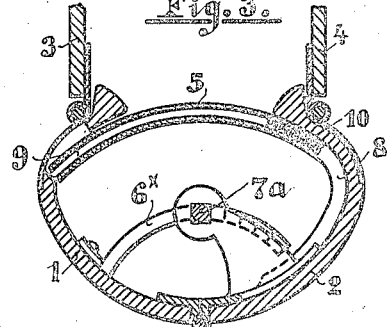
Figure 4:
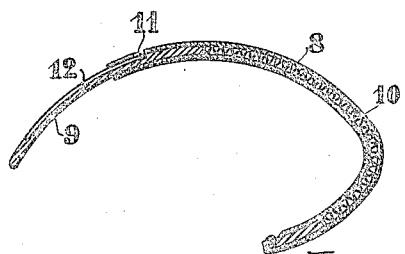

In the accompanying drawings Figure 1 is a cross section of the pair of bases fully opened out and with the retaining members elongated to their utmost length. Fig. 2 is a sectional view of the same pair of bases partly opened up. Fig. 3 is a cross section of the same parts when closed, also showing a section of the locking mechanism. Fig. 4 is a longitudinal section of one of the expanding retaining members. Fig. 5 is a cross section of the said retaining members on a larger scale. Fig. 6 shows in section a part of the pair of bases with another form of the locking device partly opened up. Fig. 7 is a plan view of a part of the bases with the same locking device. Fig. 8 a part of the same locking device. Fig. 9 a side view of the portion of the locking mechanism on one of the bases. Fig. 10 a part of the same in another position. Fig. 11 is an elevation of the first-mentioned form of locking mechanism. Fig. 12 the last mentioned mechanism in another side view and partly in section. Fig. 13 the same parts in another position. Fig. 14 an outer view of a member of the locking device and Fig. 15 an outer view of a member which collaborates with the member in Fig. 14.

The binder comprises two bases or back sections 1 and 2 hinged together in a known manner, and two cover boards 3 and 4 hinged one to each base or back section; curved retaining members 5 attached two on each back section and consisting each of two pieces 8 and 9 the first mentioned of which is tubular and fastened to the one base and the other piece 9 slidable into the tubular piece and loaded by a spring 10 so that it is caused to elongate the total length of the retaining member (Fig. 4) when the bases are opened up (Figs. 1 and 2). Instead of being tubular the fixed piece 8 may be of any other suitable construction provided that the piece 9 may be able to move out and in along the same, that is to say the piece 9 may be a pipe and arranged outside the solid piece 8. Further the binder comprises a ratchet segment 6 attached to the one base and a ratchet pawl or pin 7 attached to the opposite base. The movable piece 9 of the retaining members is prohibited from being thrown out of the fixed piece 8 by a stopping device, consisting in a tongue 11 sliding in a slot 12 in the movable piece and retaining said piece when pushed out in its utmost position by engaging with the inner end of said slot. The cross section of the retaining members is preferably elliptical with the major axis parallel with the length of the bases and the minor axis directed toward the bases for the purpose not to spoil the edges of the holes in the leaves attached on the retaining members when turning over the leaves from the one cover of the binder to the opposite cover.

The locking device comprises, as mentioned, a quadrant 6 with ratchet teeth the center of which lies in or close to the turning axis between the two pair of bases and fastened to the one base, and a ratchet pawl or pin 7 connected to the opposite base and arranged to be slid to and from the quadrant 6 and to engage the teeth of same. This sliding movement of the pawl or pin 7 may be effected in different ways and here two preferable forms will be demonstrated. The one form, illustrated in the Figs. 6–10, comprises a slidable bar or rod 7ª mounted lengthwise of the bases in sleeves 13, 14 and extending to one end of the bases. The inner end of the bar is bent over U-shaped and serves for the ratchet pawl proper. The bar 7ª is at the outer end provided with a button 15 loaded by a spring 16 to bring the pawl end 7 in engagement with the ratchet segment 6. The base or back section 2 is provided with a plate spring 17 with two tongues 18, 19 extending over the bar 7ª, the one tongue 19 of which lies between the bar 7ª and the toothed segment 6, so long as the latter moves above the bar. The spring and its tongues are thus constructed so that the tongue 18 is caused to be pressed toward the bar 7ª as soon as the tongue 19 gets pressed toward the same bar by the toothed segment owing to the movement of the segment above the bar. The bar 7ª is provided also with a notch 20 to catch the tongue 18 (Fig. 10) as soon as the ratchet pin 7 is withdrawn from engagement with the toothed segment 6 through which the unintended reëngaging is prevented. In accordance with the second mode of construction of the locking device (Figs. 11–15), the ratchet pawl or pin 7ˣ consists as before in the inner end of a non-turnable bar or rod 7ª, slidable on one base or back section and extending to the end of said base. This bar is at the outer end provided with a sleeve or head 21 the inner end surface 22 of which is cut away as a screw and in engagement with a corresponding screw cut surface 23 on a second sleeve 24 which is turnable but not slidable on the bar 7ª being placed inside the sleeve 26, the latter being held in position by a fixed bearing 25. The sleeve 26 is shaped as a cap on the head 21 and provided with external spokes or, as in the drawing, with a hole for a key 27 to turn the sleeve.

In order to prevent an unintended opening of the binder the cap may be immovable and the member corresponding to 26 adapted to turn in said cap, a secret lock being provided which admits the opening of the binder to insert or withdraw leaves by an individual key only. A spring 26ª between the head 21 and the outer end of the cap 26 presses the bar 7ª in the direction toward the toothed segment 6ˣ so that the pawl 7ˣ always is inclined to engage with the said segment. This inclination will be increased by the aid of a spiral spring 28 which tends to rotate the cap 26 to return it to the locked position. In order to keep the pawl 7ˣ away from the toothed segment there is made a cut 29 in the top of the one screw surface. The surface 23 catches the end of the opposite screw surface 22 as soon as the head 26 has been turned so far that the pawl 7ˣ releases the toothed segment. Now the spring 28 is not able to turn the cap 26 and the restoring of the engagement between the pawl and the segment can be effected only by a push on the head so that the cut 29 releases the screw surface 22. There is a certain amount of endwise play of the head 26 in its bearing.

The devices are intended to work as follows: As the covers are brought together to inclose the smallest possible number of leaves the part 9 of the retaining members is fully pushed back into the tubular part 8 owing to the pressure by the back section on the top end of the said part 9. Now the pawl 7 or 7ˣ is in engagement with the first or innermost tooth of the segment 6 or 6ˣ. The space between the back sections may be increased as required until the pawl 7ˣ reaches the latest or outermost tooth of the segment. During this increasing of the width of the binder the retaining members automatically expand in consequence of the pressure by the spring 10 on the part 9 so that the top end of that part always will be in contact with the opposite back section, until the binder is opened out so far that the detent 11 prevents any further expansion of the retaining members. The retaining members are caused to expand so much that when the binder is fully opened out, all the leaves which can be inserted in the same, are able to be safely retained on the retaining members of the back section in order to facilitate the withdrawing of leaves without risk of losing the connection between the leaves and the retaining members. The difference between the largest and the smallest number of leaves that can be inclosed between the covers and taken up on the expanding retaining members is, as shown on the drawings, rather large. The opening of the binder is effected in the first mentioned form of construction by a push on the button 15, through which the tongue 18 of the spring 17 is caused to engage with the notch 20 in the bar 7ª to keep the latter withdrawn from the segment 6. In the second mentioned form of construction the same effect is gained by turning the head 26 which movement by the action of the screw surfaces 22 and 23 withdraws the pawl from the segment 6 and keeps the pawl in this position when the cut 29 catches the end 30 of the surface 22. When the back sections are opened so far that the toothed segment 6 releases the tongue 19 of the plate spring 17 the tongue 18 rises from the notch 20 and the pawl 7ˣ is immediately pushed back toward the segment by the action of the spring 26ª so that, when the back sections are closed again, the pawl engages with the segment. In the latter form of construction the pawl 7ˣ is brought into reëngagement with the segment as before mentioned by an easy push on the head 26 which causes the cut 29 to release the end 30 of the surface 22, and thus a return rotation of the cap 26 by the spring 28.

Having thus described my said invention what I claim as new and desire to secure by Letters Patent is:—

1. An improved loose leaf filing book or binder comprising two back- or base-sections hinged together, inwardly bent expanding retaining members projecting from the inner sides of the back sections and consisting each of two pieces slidable along each other, one piece of each retaining member fastened at its rear end to one back section and the top end of the other piece resting against the opposite back section, a spring inserted between the two pieces in each retaining member, inclined to separate the two pieces so as to elongate the total length of the retaining members, and a locking device adapted to retain the back sections closed to any desired extent.

2. An improved loose leaf filing book or binder comprising two back or base-sections hinged together, inwardly bent expanding retaining members projecting from the inner side of the back sections and consisting each of two pieces slidable along each other, one piece shaped as a tube and fastened at its rear end to the one back section, and the other piece inserted in the tubular piece and resting at its top end against the opposite back section, a spiral spring placed inside the tubular piece and acting upon the other piece so as to throw this piece out of the tubular piece in order to increase the total length of the retaining members, and a locking device adapted to retain the back sections closed to any desired extent.

3. An improved loose leaf filing book or binder comprising two back or base sections hinged together, inwardly bent expanding retaining members in two pieces slidable along each other, one piece being tubular and the other piece inserted into the first mentioned piece, a spiral spring inside the tubular piece and bearing on the other piece, a member in the tubular piece sliding in a slot in the other piece and bearing against an abutment in this piece when the pieces are thrown apart so far as desired in order to prevent entire separation of the two pieces, and a locking device adapted to retain the back sections closed to any desired extent.

4. An improved loose leaf filing book or binder comprising two back or base sections hinged together, inwardly bent retaining members adapted to automatically expand when the back sections are opened out, said retaining members being of an elliptical cross section with the minor axis directed toward the back sections and the major axis parallel with the back sections, and a locking device adapted to retain the back sections closed to any desired extent.

5. An improved loose leaf filing book or binder comprising two back or base sections hinged together, inwardly bent, automatically expanding retaining members in two pieces, stopping members to prevent the entire separation of the two pieces of the retaining members, and a locking device adapted to retain the back sections closed and consisting in a toothed segment fastened at one end to one back section and curved inwardly toward the opposite back section, and a ratchet pawl or pin, slidably attached to the last mentioned back section so as to be able to engage with a desired tooth on the said segment and reachable from one end of the back sections, and means for holding the pawl in and out of engagement with the toothed segment.

6. An improved loose leaf filing book or binder comprising two back or base sections hinged together, inwardly bent automatically expanding retaining members on said back sections and a locking device adapted to retain the back sections closed to any desired extent and consisting in a toothed segment fastened at its rear end to one back section and a ratchet pawl slidably attached to the opposite back section, a bar or rod extending from the rear end of said pawl out to the end of the back sections and provided there with a button, a spring which tends to bring the pawl into engagement with the toothed segment, a plate spring fastened to the same back section as the pawl and provided with two tongues extending across the pawl bar or rod, a notch in the said bar or rod adapted to catch one tongue of the spring when the bar is withdrawn from the segment and the other tongue adapted to be pressed down by the toothed segment so as to press said first tongue down against the pawl bar or rod and thus cause the first mentioned tongue to tend to engage said notch.

In testimony whereof I have hereunto set my hand in presence of two subscribing witnesses.

JOHN TRÄGÅRDH.

Witnesses:
  JOHN AHLSSAN,
  ERIC MIDHOLM.